United States Patent Office 3,477,986
Patented Nov. 11, 1969

3,477,986
POLYAMIDES STABILIZED WITH COMBINATION OF A COPPER COMPOUND AND A PHOSPHONIUM HALIDE
Karl Heinz Hermann and Hans Rudolph, Krefeld-Bockum, Germany, assignors to Farbenfabriken Bayer Aktiengesellschaft, Leverkusen, Germany, a corporation of Germany
No Drawing. Filed Apr. 20, 1967, Ser. No. 632,176
Claims priority, application Germany, Apr. 28, 1966, F 49,037; July 21, 1966, F 49,749
Int. Cl. C08g 41/02, 51/62, 51/58
U.S. Cl. 260—45.75                            8 Claims

ABSTRACT OF THE DISCLOSURE

Synthetic polyamides, having recurring interlinear carbonamide groups as an integral part of the main polymer chain, stabilized against the degradative effect of heat and oxygen by incorporating with the polyamide a copper compound and a phosphonium halide of the formula

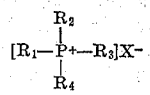

wherein $R_1$ is hydrogen or an alkyl, cyloalkyl, aryl or aralkyl radical; $R_2$, $R_3$ and $R_4$ are the same or different alkyl, cycloalkyl, aryl or aralkyl radicals; and X is chlorine, bromine or iodine.

---

This invention relates to a heat stabilised synthetic linear polyamide containing a combination of a copper compound and a substituted phosphonium halide as stabilising agent.

Mouldings based on polyamides obtained by the polymerisation both of diamines and dicarboxylic acids and of aminocarboxylic acids or their lactams, for example, filaments, bristles, films, etc., are damaged by the action of air and oxygen, particularly at elevated temperatures, their relative viscosity being decreased and their strength and elasticity markedly deteriorating. At the same time, the polyamides become increasingly browner in colour.

It is known that polyamides can be protected against the harmful influences of air and oxygen at elevated temperatures by the addition of stabilisers. The following compounds, for example have already been proposed as stabilisers: manganese salts of inorganic and organic acids, copper salts of inorganic or organic acids, derivatives of the oxyacids of phosphorus, aromatic amines and phenols. Combinations of these groups of compounds either with one another or with compounds which, on their own do not have any stabilising effect, such as alkali metal and alkaline earth metal halides, iodine, arylsulphonic acids, mercaptobenzimidazole, etc. have also been preferentially used. Unfortunately, conventional stabilisers are attended by the disadvantage that their stabilising action is not strong enough, as is the case for example with manganese salts, phosphorus compounds and phenols, or by the disadvantage that they are sensitive to light and as a result promote discolouration of the polyamide over a period of time, as is the case, for example, with aromatic amines and phenols. In most cases, the addition of copper salts which, basically, are extremely effective stabilisers, particularly when used in conjunction with alkali metal or alkaline earth metal iodides, also promotes discolouration of the polyamide. Furthermore, the alkali metal and alkaline earth metal iodides can be extracted with water so that they cannot be added to polyamides, for example polycaprolactam or copolyamides of caprolactam, from which monomeric components, have first to be removed by extraction with hot water. The extractability of the alkali metal and alkaline earth metal iodides is also a disadvantage in cases where the stabilised polyamides will normally come into contact with water or aqueous solutions.

It has now been found that polyamides can be effectively stabilised against oxidative degradation at elevated temperatures without any of the aforementioned disadvantages, by using as a stabiliser a combination of a copper compound and a substituted tertiary or quaternary phosphonium halide corresponding to the general formula:

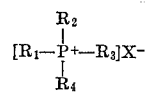

in which $R_1$ represents hydrogen or an optionally substituted alkyl-, cycloalkyl-, aryl- or aralkyl radical, $R_2$, $R_3$ and $R_4$ represent the same or different, optionally substituted alkyl-, cycloalkyl-, aryl or aralkyl radicals, and X represents chlorine, bromine or iodine.

Examples of these phosphonium halides include tributyl-phosphonium hydrochloride,
tributylphosphonium hydrobromide,
tricyclohexylphosphonium hydrochloride,
tricyclohexylphosphonium hydrobromide,
triphenylphosphonium hydrochloride,
triphenyl-phosphonium hydrobromide,
tris-($\beta$-cyanoethyl)-phosphonium hydrochloride,
tris-($\beta$-cyanoethyl)-phosphonium hydrobromide,
tris-($\beta$-cyanoethyl)-phosphonium hydriodide,
tetrabutylphosphonium chloride,
tetrabutylphosphonium bromide,
tetraphenyl-phosphonium chloride,
tetraphenylphosphonium bromide,
trimethylbenzylphosphonium chloride,
trimethylbenzylphosphonium bromide,
tricyclohexylmethylphosphonium chloride,
tricyclohexymethylphosphonium bromide,
triphenylmethylphosphonium chloride,
triphenylmethylphosphonium bromide,
tris-($\beta$-cyanoethyl)-methyl-phosphonium chloride,
tris-($\beta$-cyanoethyl)-methyl-phosphonium bromide,
tris-($\beta$-cyanoethyl)-allylphosphonium chloride,
tris-($\beta$-cyanoethyl)-allylphosphonium bromide,
triethyl-($\beta$-hydroxyethyl)-phosphonium chloride,
triethyl-($\beta$-hydroxyethyl)-phosphonium bromide,
diethylmethyl-p-chlorophenylphosphonium chloride,
diethylmethyl-p-chlorophenylphosphonium bromide,
triethyliodomethyl-phosphonium chloride and
triethyliodomethylphosphonium bromide,
tributylphosphonium hydriodide,
tricyclohexylphosphonium hydriodide,
triphenylphosphonium hydriodide,
tributylmethylphosphonium iodide,
tetrabutylphosphonium iodide,
tricyclohexylmethylphosphonium iodide,
triphenylmethylphosphonium iodide,
tetramethylphosphonium iodide,
tetraethylphosphonium iodide,
tributylbenzylphosphonium iodide and
triisopropylmethylphosphonium iodide.

Numerous other examples are described inter alia in the book entitled "Organophosphorus compounds" by Kosolapoff, 1950, pages 86–94.

The phosphonium halides are generally added in quantities of between 0.001% and 5.0% by weight, based on the polyamide, and preferably in quantities of between 0.01% and 0.5% by weight. Suitable copper compounds include the salts of inorganic acids, for example Cu(II)

$Cl_2$, Cu(I)Cl, Cu(II)Br$_2$, Cu(I)Br, Cu(I)I, Cu(I)CN, Cu(II)SO$_2$, etc., the salts of organic carboxylic acids for example Cu-acetate, Cu-stearate, Cu-benzoate, the salts of monovalent or polyvalent phenols, and the complex compounds of such copper salts with ammonia, amines, amides, lactams, phosphites, phosphines, cyamides, etc. The copper compounds are preferably added in such a quantity that the polyamide contains between 0.001% and 5.0% by weight, preferably between 0.01% and 0.5% by weight of this compound. The stabilisers may be added to the polyamide-forming starting mixture before polymerisation which is then carried out conventionally either as a continuous cycle or as a batch process. It is also possible, however, to mix the stabiliser combination either together or separately, optionally even in the form of a concentrate in polyamide, with the polyamide melt, either during or after polymerisation, in which case conventional mixing units such as extruders, kneaders, stirrers, etc., may be used.

In addition to the stabilisers, the polyamides may contain the usual additives such as pigments, dyes, light stabilisers, optical brighteners, fillers such as glass fibres or asbestos fibres, lubricants and mould-release agents, plasticisers, crystallisation initiators, etc.

The polyamides stabilised in accordance with the invention, in particular against oxidative damage at elevated temperatures, are eminently suitable for the production of industrial silks for fishing nets, drive belts, conveyor belts, etc., tyre cords and mouldings which are subjected to thermal stressing in the presence of air or oxygen.

Broadly speaking, the following advantages are obtained by using copper compounds in combination with phosphonium halides:

They do not promote discolouration when added before or during polymerisation and when worked in by means of a screw extruder, nor do they produce any increase in the melt viscosity due to partial cross-linking or branching (when phosphorus and phosphoric acids, their esters and halides are used) which would lead to difficulties in processing, particularly in the production of fibres. No special preventive measures have to be taken so far as corrosion and handling are concerned, for example, when halides of phosphorous and phosphoric acids are used.

Treatment of the polyamide with water has no effect on the stabilising action because the phosphonium halides are not extracted. The following examples illustrate more particularly the invention.

Example 1

1 kg. of a conventionally prepared colourless polycaprolactam with a relative viscosity of 3.12 (as measured on a 1% by weight solution in m-cresol at 25° C. in an Ubbelohde viscosimeter) is fused by means of a conventional screw extruder and at the same time homogeneously mixed with different stabilisers. The stabiliser-containing polycaprolactam is spun into an approximately 3 mm-diameter filament, granulated and dried. The granulate is then stored at 150° C. in a drying cabinet to which air has free access and its relative viscosity is measured after intervals of 144, 500 and 1000 hours.

The test results are set out in Table I. Tests 8–10 represent camparison tests (in which no phosphonium halide was added).

TABLE I

| Test No. | Cu-compound | G. | Percent Cu in the Polyamide | Phosphonium chloride or bromide | G. | Percent | Relative viscosity after— Mixing | 144 hours | 500 hours | 1,000 hours |
|---|---|---|---|---|---|---|---|---|---|---|
| 1 | Cu(I)I | 0.36 | 0.012 | Tributylmethylphosphonium chloride | 1.5 | 0.15 | 3.17 | 3.92 | 3.40 | 3.06 |
| 2 | Cu(I)I | 0.36 | 0.012 | Tributylmethylphosphonium bromide | 3.0 | 0.3 | 3.16 | 3.96 | 3.51 | 3.19 |
| 3 | Cu(I)I | 0.36 | 0.012 | Tris-($\beta$-cyanoethyl)-methylphosphonium chloride | 2.1 | 0.21 | 3.18 | 4.00 | 3.62 | 3.10 |
| 4 | Cu(I)I | 0.36 | 0.012 | Tris-($\beta$-cyanoethyl)-methylphosphonium bromide | 2.5 | 0.25 | 3.16 | 3.95 | 3.59 | 3.11 |
| 5 | Cu(I)I | 0.36 | 0.012 | Tris-($\beta$-cyanoethyl)-allylphosphonium bromide | 2.8 | 0.28 | 3.18 | 3.98 | 3.58 | 3.08 |
| 6 | Cu(I)I | 0.36 | 0.012 | Tris-($\beta$-cyanoethyl)-benzylphosphonium chloride | 2.8 | 0.28 | 3.19 | 3.96 | 3.63 | 3.12 |
| 7 | Cu(II)acetate·H$_2$O | 0.34 | 0.012 | Tributylphosphonium hydrobromide | 2.0 | 0.20 | 3.17 | 4.02 | 3.65 | 3.14 |
| 8 | Cu(I)I | 0.36 | 0.012 |  |  |  | 3.21 | 3.91 | 3.26 | 2.78 |
| 9 | Cu(II)acetate·H$_2$O | 0.34 | 0.012 |  |  |  | 3.16 | 3.18 | 2.82 | 2.46 |
| 10 | K$_3$Cu(CN)$_4$ | 0.50 | 0.012 |  |  |  | 3.12 | 3.12 | 2.78 | 2.58 |

Example 2

A mixture of 1.0 kg. of caprolactam, 35 g. of $\epsilon$-aminocaproic acid and different stabilisers is polycondensed in the usual way in an autoclave at a temperature of 270° C. The colour of the polyamides obtained is given in Table II. Tests 10–16 represent comparison tests.

TABLE II

| Test No. | Cu-compound | G. | Percent Cu in the Polyamide | Phosphonium chloride or bromide | G. | Percent | Colour of the polyamide |
|---|---|---|---|---|---|---|---|
| 1 | Cu(I)I | 0.34 | 0.012 | Tributylphosphonium hydrobromide | 2.0 | 0.2 | Colourless. |
| 2 | Cu(II)acetate·H$_2$O | 0.34 | 0.012 | Triphenylphosphonium hydrochloride | 2.0 | 0.2 | Do. |
| 3 | Cu(I)Br | 0.27 | 0.012 | Triphenylphosphine hydroiodide | 2.0 | 0.2 | Do. |
| 4 | Cu(II)acetate·H$_2$O | 0.34 | 0.012 | do | 4.0 | 0.4 | Do. |
| 5 | Cu(II)Cl$_2$·2H$_2$O | 0.32 | 0.012 | do | 4.0 | 0.4 | Do. |
| 6 | Cu(I)I | 0.34 | 0.012 | Triphenylmethylphosphonium iodide | 1.0 | 0.1 | Do. |
| 7 | Cu(II)acetate·H$_2$O | 0.34 | 0.012 | do | 2.0 | 0.2 | Do. |
| 8 | Cu(I)I | 0.34 | 0.012 | Tributylmethylphosphonium iodide | 1.5 | 0.15 | Do. |
| 9 | Cu(II)acetate·H$_2$O | 0.34 | 0.012 | do | 2.5 | 0.25 | Do. |
|  |  |  |  | Other additives |  |  |  |
| 10 | Cu(I)Br | 0.27 | 0.012 |  |  |  | Green-grey. |
| 11 | Cu(I)Br | 0.27 | 0.012 | Tridecylphosphite | 1.0 | 0.1 | Red-brown. |
| 12 | Cu(I)Br | 0.27 | 0.012 | Phosphorous acid | 0.3 | 0.03 | Do. |
| 13 | Cu(II)acetate·H$_2$O | 0.34 | 0.012 |  |  |  | Red-grey. |
| 14 | Cu(II)acetate·H$_2$O | 0.34 | 0.012 | Tridecylphosphite | 1.0 | 0.1 | Blue-red. |
| 15 | Cu(II)acetate·H$_2$O | 0.34 | 0.012 | Phosphorous acid | 0.3 | 0.03 | Grey-black. |
| 16 | Cu(II)Cl$_2$·H$_2$O | 0.32 | 0.012 | Potassium iodide | 5.0 | 0.5 | Green. |

Example 3

1 kg. of a conventionally prepared colourless polycaprolactam with a relative viscosity of 3.12 (as measured on a 1% solution in m-cresol) is fused by means of a conventional screw extruder and at the same time homogeneously mixed with different stabilisers. The stabiliser-containing polycaprolactam is spun into an approximately 3 mm.-diameter filament, granulated and dried.

The granulate is then stored at 150° C. in a drying cabinet to which air has free access, and its relative viscosity is measured after intervals of 144, 500 and 1000 hours.

The test results are set out in Table III, Tests 10–12 represent comparison tests.

2. The synthetic polyamide of claim 1, wherein said copper compound is cupreous iodide.
3. The synthetic polyamide of claim 1, wherein said copper compound is copper acetate.
4. The synthetic polyamide of claim 1, wherein said phosphonium halide is tributyl-methyl-phosphoniumiodide.
5. The synthetic polyamide of claim 1, wherein said phosphonium halide is triphenyl-phosphonium-hydroiodide.
6. The synthetic polyamide of claim 1, wherein said phosphonium halide is tributylphosphonium-hydroiodide.
7. The synthetic polyamide of claim 1, wherein said phosphonium halide is tri - ($\beta$-cyanoethyl)benzyl-phosphoniumiodide.

TABLE III

| Test No. | Cu-compound | G. | Percent Cu in the polyamide | Phosphonium iodide | G. | Percent | Relative viscosity after— | | | |
|---|---|---|---|---|---|---|---|---|---|---|
| | | | | | | | Mixing | 144 hrs. | 500 hrs. | 1,000 hrs. |
| 1 | Cu(I)I | 0.36 | 0.012 | Triphenylphosphine hydroiodide | 1.7 | 0.17 | 3.15 | 3.98 | 3.40 | 3.12 |
| 2 | Cu(I)I | 0.36 | 0.012 | ___do___ | 3.5 | 0.35 | 3.17 | 4.11 | 3.59 | 3.31 |
| 3 | Cu(II)-acetate·H$_2$O | 0.34 | 0.012 | ___do___ | 3.5 | 0.35 | 3.13 | 4.06 | 3.61 | 3.29 |
| 4 | K$_3$Cu(CN)$_4$ | 0.50 | 0.012 | ___do___ | 1.0 | 0.1 | 3.14 | 3.96 | 3.55 | 3.14 |
| 5 | Cu(I)I | 0.36 | 0.012 | Triphenylmethylphosphonium iodide | 1.8 | 0.18 | 3.13 | 3.99 | 3.42 | 3.15 |
| 6 | Cu(I)I | 0.36 | 0.012 | ___do___ | 3.6 | 0.36 | 3.16 | 4.14 | 3.63 | 3.32 |
| 7 | Cu(II)-acetate·H$_2$O | 0.34 | 0.012 | ___do___ | 3.6 | 0.36 | 3.14 | 4.18 | 3.65 | 3.32 |
| 8 | Cu(I)I | 0.36 | 0.012 | Tributylmethylphosphonium iodide | 1.5 | 0.15 | 3.19 | 3.98 | 3.45 | 3.19 |
| 9 | Cu(I)I | 0.36 | 0.012 | ___do___ | 3.0 | 0.3 | 3.15 | 4.08 | 3.57 | 3.24 |
| 10 | Cu(I)I | 0.36 | 0.012 | | | | 3.21 | 3.91 | 3.26 | 2.78 |
| 11 | Cu(II)acetate·H$_2$O | 0.34 | 0.012 | | | | 3.16 | 3.18 | 2.82 | 2.46 |
| 12 | K$_3$Cu(CN)$_4$ | 0.50 | 0.012 | | | | 3.12 | 3.12 | 2.78 | 2.58 |

What we claim is:

1. A synthetic polyamide having a recurring interlinear carbonamide group as an integral part of the main polymer chain, stabilized against the degradative effect of heat and oxygen by incorporating with the polyamide (a) 0.001% to 5.0% by weight of a copper compound and (b) 0.001% to 5.0% by weight of a phosphonium halide of the formula

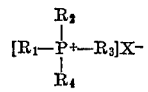

wherein R$_1$ represents hydrogen or an alkyl-, cycloalkyl-, aryl- or aralkyl radical; R$_2$, R$_3$ and R$_4$ represent the same or different alkyl-, cycloalkyl-, aryl- or aralkyl radicals; and X represents chlorine, bromine or iodine.

8. The synthetic polyamide of claim 1, wherein said phosphonium halide is tris - ($\beta$-cyanoethyl)benzyl-phosdide.

References Cited

UNITED STATES PATENTS

| 2,705,227 | 3/1955 | Stamatoff | 260—45.7 |
| 3,268,323 | 8/1966 | Goyette | 260—606.5 |
| 3,309,425 | 3/1967 | Gillham et al. | 260—893 |

DONALD E. CZAJA, Primary Examiner

R. A. WHITE, Assistant Examiner

U.S. Cl. X.R.

260—45.7

PO-1050
(5/69)

UNITED STATES PATENT OFFICE
CERTIFICATE OF CORRECTION

Patent No. 3,477,986      Dated November 11, 1969

Inventor(s) KARL HEINZ HERMANN and HANS RUDOLPH

It is certified that error appears in the above-identified patent and that said Letters Patent are hereby corrected as shown below:

Column 6, Claim 8, "tris-(β-cyanoethyl)benzyl-phos-dide." should read --- triphenyl-methyl-phosphonium iodide. ---

SIGNED AND SEALED
FEB 24 1970

(SEAL)
Attest:

Edward M. Fletcher, Jr.
Attesting Officer

WILLIAM E. SCHUYLER, JR.
Commissioner of Patents